(12) United States Patent
Van Mill et al.

(10) Patent No.: US 7,329,189 B2
(45) Date of Patent: Feb. 12, 2008

(54) FLEX DRIVE CONNECTOR

(75) Inventors: Michael Van Mill, Shell Rock, IA (US); Alan Gustafson, Aplington, IA (US); Daryl Rubner, Strawberry Point, IA (US)

(73) Assignee: Unverferth Manufacturing Co., Inc., Shell Rock, IA (US)

( * ) Notice: Subject to any disclaimer, the term of this patent is extended or adjusted under 35 U.S.C. 154(b) by 297 days.

(21) Appl. No.: 11/043,067

(22) Filed: Jan. 27, 2005

(65) Prior Publication Data

US 2006/0166747 A1 Jul. 27, 2006

(51) Int. Cl.
*F16D 3/68* (2006.01)
(52) U.S. Cl. .................. 464/83; 198/659; 198/666
(58) Field of Classification Search ........... 403/180, 403/182, 226; 464/74, 83; 198/659, 666
See application file for complete search history.

(56) References Cited

U.S. PATENT DOCUMENTS

| | | | |
|---|---|---|---|
| 2,115,573 A | 4/1938 | Davison | |
| 2,712,742 A | 7/1955 | Neidhart | |
| 3,208,168 A | 9/1965 | Henschen | |
| 3,252,562 A | 5/1966 | Brembeck | |
| 3,436,069 A | 4/1969 | Henschen | |
| 3,482,464 A | 12/1969 | Reich et al. | |
| 4,101,021 A | 7/1978 | Sauer | |
| 4,621,968 A | 11/1986 | Hutchison | |
| 4,691,818 A | 9/1987 | Weber | |
| 4,747,796 A | 5/1988 | Iwai et al. | |
| 5,099,984 A | 3/1992 | Kuzub | |
| 5,099,985 A | 3/1992 | Lapeyre | |
| 5,119,931 A | 6/1992 | Barenthsen | |
| 5,129,502 A | 7/1992 | Justice | |
| 5,230,419 A | 7/1993 | Millard | |
| 5,591,083 A | 1/1997 | Kirschey | |
| 5,709,605 A | 1/1998 | Riefe et al. | |
| 6,231,450 B1 * | 5/2001 | Korus | 464/74 |
| 6,422,376 B1 | 7/2002 | Nichols et al. | |

* cited by examiner

*Primary Examiner*—Greg Binda
(74) *Attorney, Agent, or Firm*—Rothwell, Figg, Ernst & Manbeck P.C.

(57) ABSTRACT

A flexible connector may include a tube having an open end and a lower end distal from the open end, an inner surface of the open end comprising a plurality of apices forming a substantially polygonal lower cross-section, an upper shaft having an insert end disposed insertably in the open end, an outer surface of the insert end comprising a plurality of substantially planer flats forming a substantially polygonal upper cross-section normal to the driven axis of rotation, the upper cross-section being substantially similar to the lower cross-section, and an elastic member disposed compressably between each of the flats and each of the apices.

9 Claims, 7 Drawing Sheets

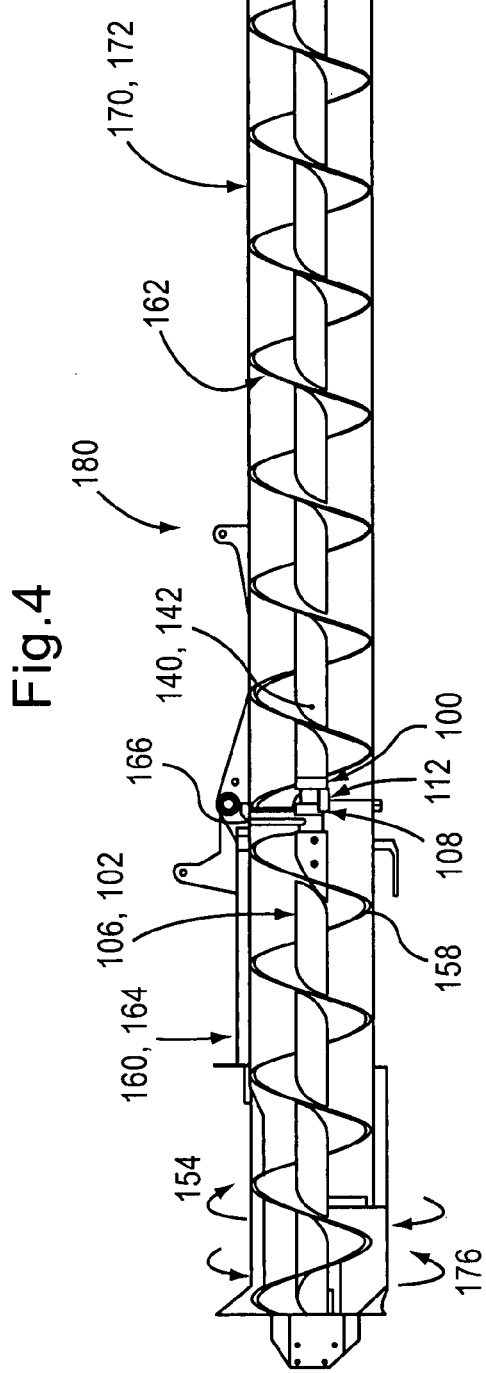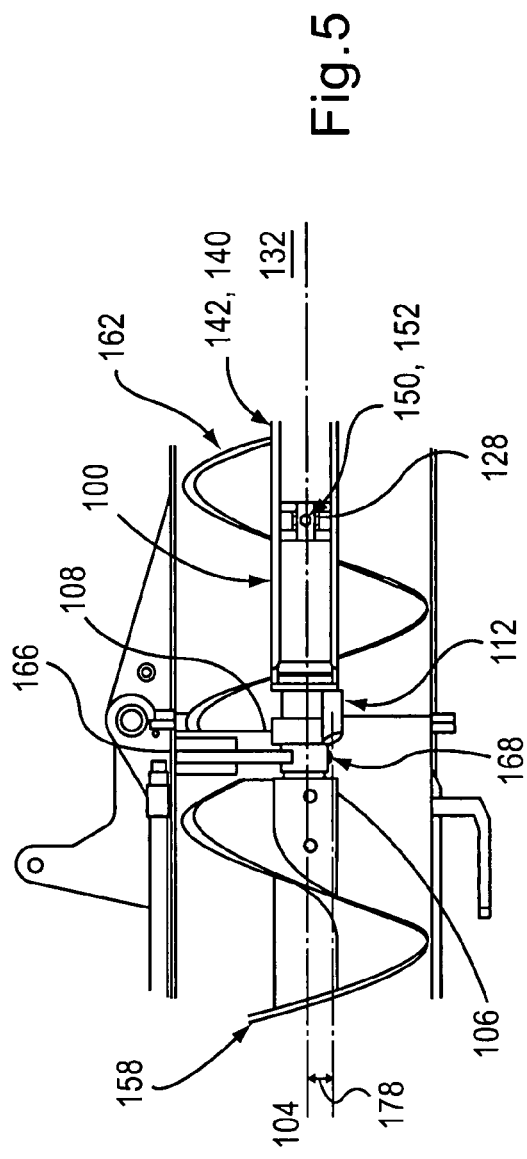
Fig.4
Fig.5

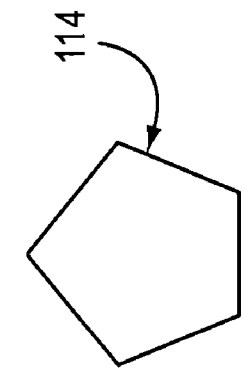
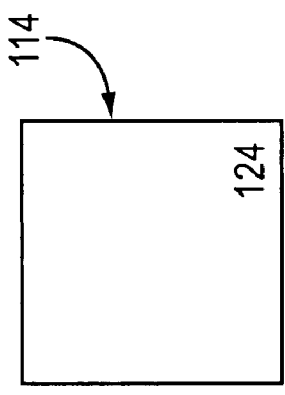
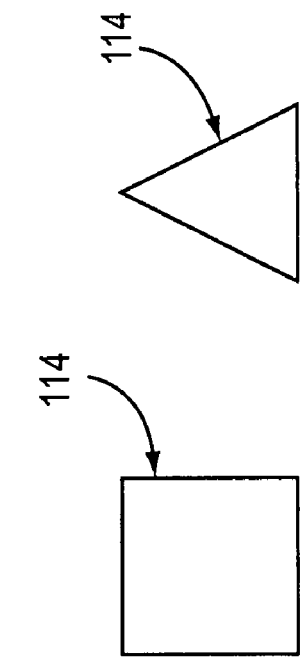
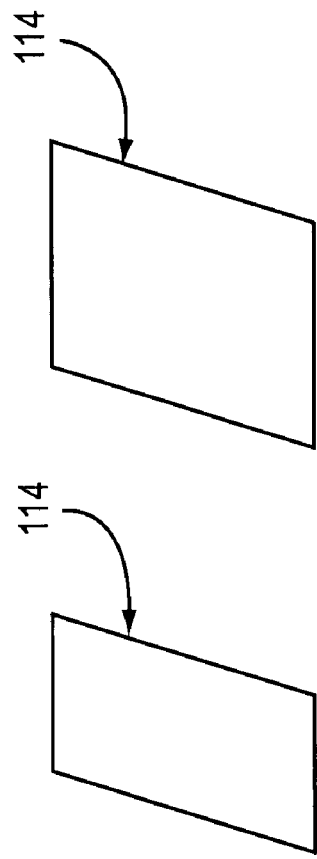
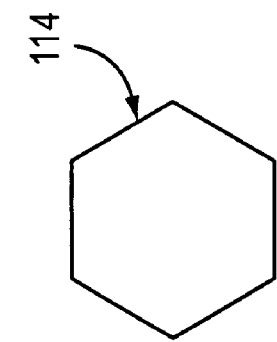
Fig.7A  Fig.7B  Fig.7C  Fig.7D  Fig.7E  Fig.7F  Fig.7G

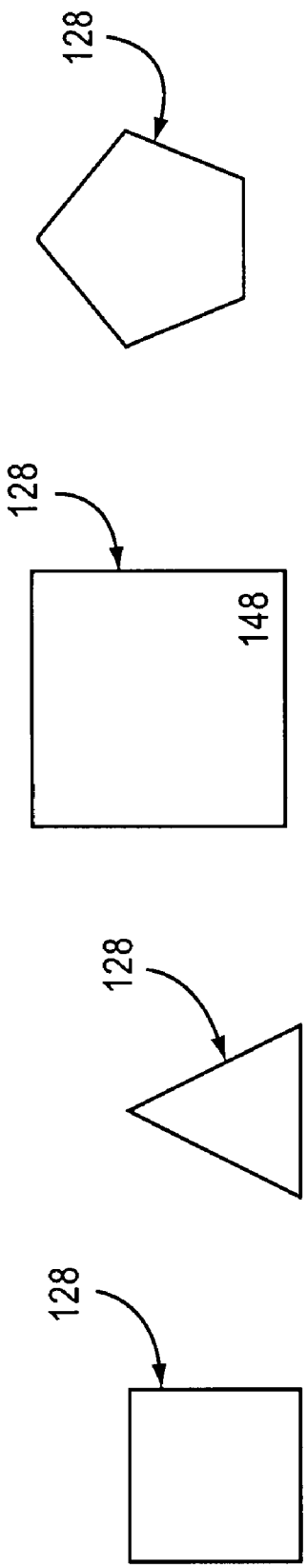

FLEX DRIVE CONNECTOR

BACKGROUND OF THE INVENTION

1. Field of the Invention

The invention relates to the field of connectors, and more particularly to connectors of the flexible variety.

2. Description of the Related Art

Segments of rotating shafts, such as auger shafts, may have to bend. Shafts may be made to bend by fitting them with joints. These joints are required to transfer torque between segments of rotating shafts as well as allowing some axial misalignment of one segment relative to another. Auger sections used with tractors may experience high impact loads when starting. Tractors with high (200+ hp) power motors may produce particularly large impact loads. A tractor that applies a high input power to move a large auger inertia may impart a severe strain on an auger coupling.

Some examples of joints that may be used to connect segments of rotating shafts are universal or constant velocity joints. Splined sections may also be installed between segments of rotating shafts to take up axial displacement of one segment relative to another segment. Sometimes universal or constant velocity joints are combined with splined segments, like a propellor shaft on an automobile. Separate splined section to adjust for length takes up space, and it's difficult to wrap a helical blade around a spline.

A four-prong drive dog may be used to reduce impact by reducing the amount of rotation between the two auger sections before contact. A four-prong drive dog, however, may not allow the spiral planes, i.e. edges of the connecting auger blades to align. Elastic or "rope" drives have been tried as well. Rope drives, however, wind up, storing some energy in the form of deformation before releasing it. Such storage and release impart differences in angular velocities between the shaft segments they connect. These angular velocity differences cause variations in the speeds at which materials proceed through the auger. Speed differences produce local pile-ups of material that may contribute further to clogs and clumps, which may interfere with the auguring process.

Furthermore, a rope or elastic member stretched between two segments of a shaft to impart rotational motion will necessarily be loaded in tension and shear. Elastomers, such as rubber, is often quite weak in tension or shear. An elastic connector may thus load the elastic member where it's weakest, in tension.

Augers may transport granular materials, such as grain, dust or silage. Granular or dusty materials may interfere with the operation of a universal or a constant velocity joint. The joint may become gummed up, and the moving parts of the joint may experience significant wear due to the materials being transported. Furthermore, the sliding surfaces of constant-velocity joints may become contaminated with silt and debris, making the joint work harder. Finally, universal joints, although cheap and robust, impart differences in angular velocities between the shaft segments they connect. These angular velocity differences cause variations in the speeds at which materials proceed through the auger. Speed differences produce local pile-ups of material that may contribute further to clogs and clumps, which may interfere with the auguring process.

SUMMARY OF THE INVENTION

A primary object of the invention is to overcome the deficiencies of the related art described above by providing a flexible connector. The present invention achieves these objects and others by providing a flexible connector.

In several aspects, the invention may provide a flexible connector. In particular, in a first aspect, a flexible connector may include a drive shaft having a drive end, a drive lug disposed fixedly at a surface of the drive end, a lower shaft disposed insertably within the drive end, the lower shaft having a driven lug disposed fixedly at a surface of the lower shaft substantially abutably to the drive lug, a tube having an open end and a lower end distal from the open end, the lower end disposed fixedly at the lower shaft, an inner surface of the open end comprising a plurality of apices forming a substantially polygonal lower cross-section, an upper shaft having an insert end disposed insertably in the open end, and an upper end distal from the insert end, an outer surface of the insert end comprising a plurality of substantially planer flats forming a substantially polygonal upper cross-section, the upper cross-section being substantially similar to the lower cross-section, an elastic member disposed compressably between each of the flats and each of the apices, a driven shaft having a driven end, an insert aperture having a substantially polygonal insert cross-section disposed fixably in the driven end, the insert cross-section being substantially congruent to the upper cross-section, the insert end disposed insertably within the insert aperture, wherein a torque applied to the drive shaft forces the drive lug against the driven lug, transmitting the torque to the lower shaft and the tube, wherein the torque applied to the tube compresses the elastic members against the flats, transmitting the torque to the insert end and the upper end, and wherein the insert end transmits the torque to the insert aperture and the driven shaft.

In a second aspect, a method of flexible connection may include the steps of applying a torque to a drive shaft, forcing a drive lug against a driven lug with the drive shaft, transmitting the torque to a lower shaft and a tube with the driven lug, compressing elastic members against flats with the tube, transmitting the torque to an insert end and an upper end with the elastic members, and transmitting the torque to an insert aperture and a driven shaft with the insert end.

In a third aspect, a system for flexible connection may include means for applying a torque to a drive shaft, means for forcing a drive lug against a driven lug, means for transmitting the torque to a lower shaft and a tube, means for compressing elastic members against flats, means for transmitting the torque to an insert end and an upper end, and means for transmitting the torque to an insert aperture and a driven shaft.

The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein:

FIG. 4 is a side view of an augur for use with a flexible connector according to the embodiment shown in FIG. 1;

FIG. 5 is a detail of the flexible connector of the auger shown in FIG. 4;

FIGS. 7A-7G are shapes of inner surface cross-sections for use with a flexible connector according to the embodiment shown in FIG. 1; and FIGS. 8A-8G are shapes of outer surface cross-sections for use with a flexible connector according to the embodiment shown in FIG. 1.

DETAILED DESCRIPTION OF THE PREFERRED EMBODIMENTS

It would be desirable for a connector to transmit rotation from one segment of an auger to the next with relatively constant velocity. It would further be desirable for a connector to tolerate some shaft misalignment. It would further be desirable for a connector to tolerate some linear or axial translation of one segment of an auger relative to the next. It would further be desirable for a helical augur blade to be continuous over a connector.

It would be desirable for a connector to allow sections of auger to be combined to form augers of various lengths. It would be desirable for a connector to be replaceable relatively easily. It would be desirable for a connector to be relatively tolerant of dimensional variations and instability. It would be desirable for a connector to function even when buried in grain or grain dust. It would be desirable for a connector to have no moving parts, so won't matter if it's buried in silt. It would be desirable for a connector to be inherently constant-velocity. It would be desirable for elastic elements in a connector to be loaded in compression, rather than in tension or shear.

Figure 1:
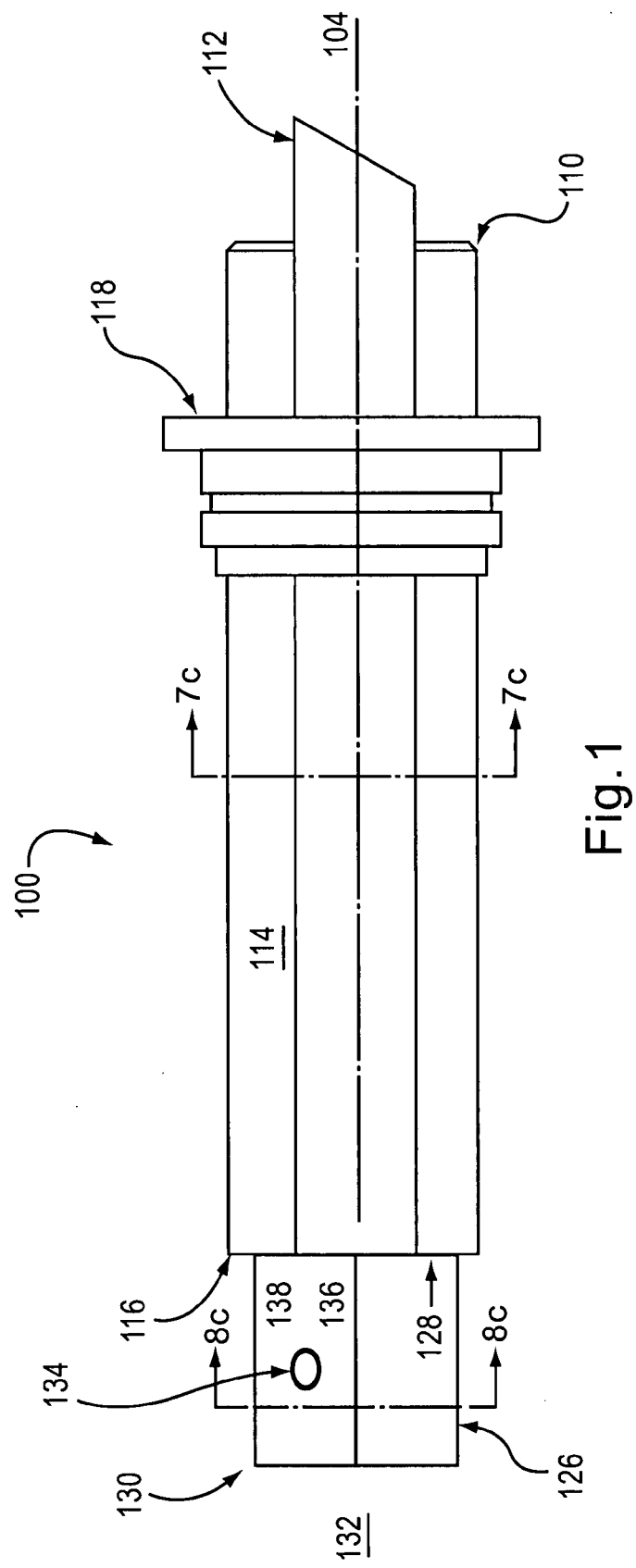
FIG. 1 is a side view of a flexible connector according to a first embodiment of the invention.
Figure 2:
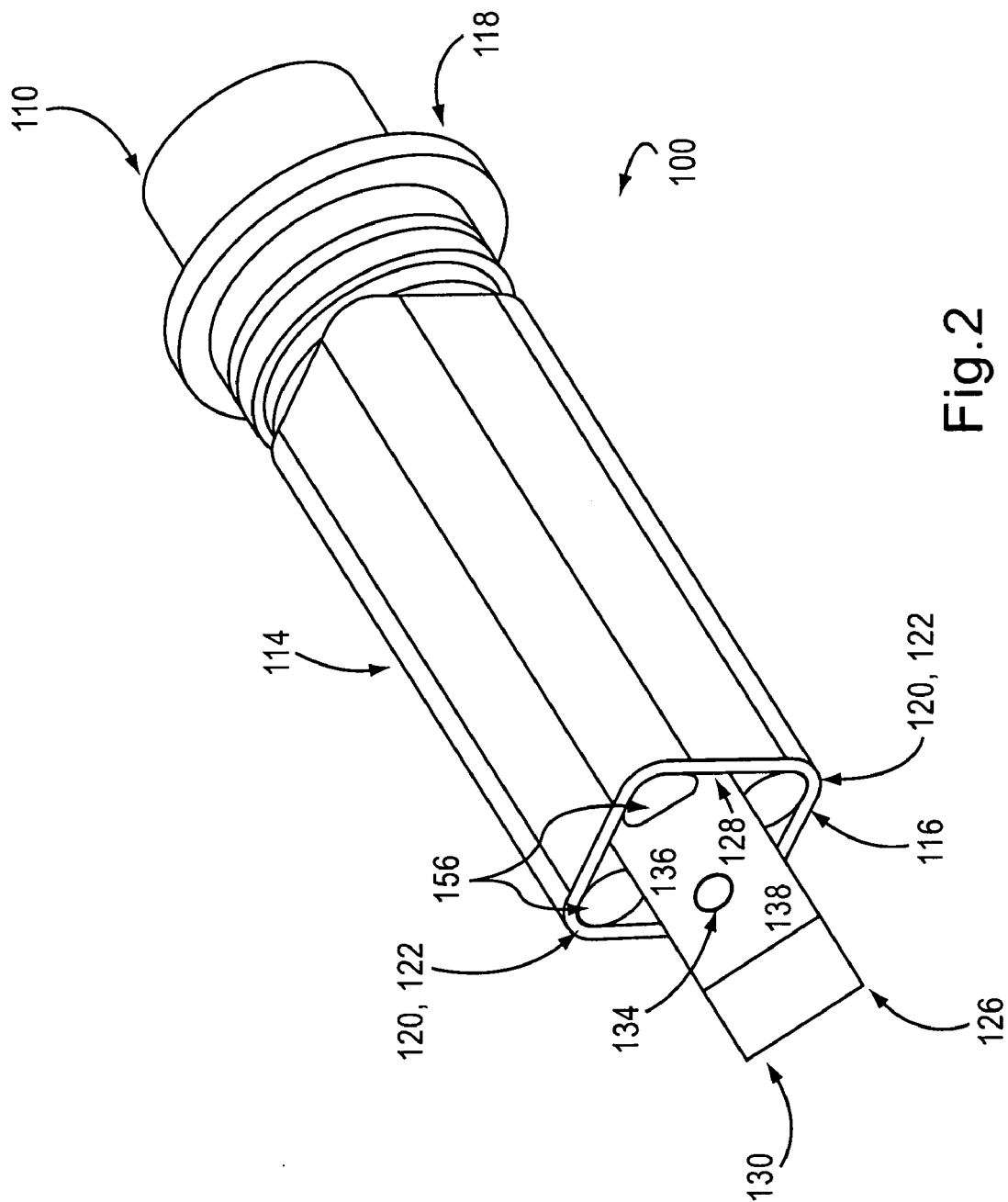
FIG. 2 is a three-quarter view of a flexible connector according to the embodiment shown in FIG. 1.
Figure 3:
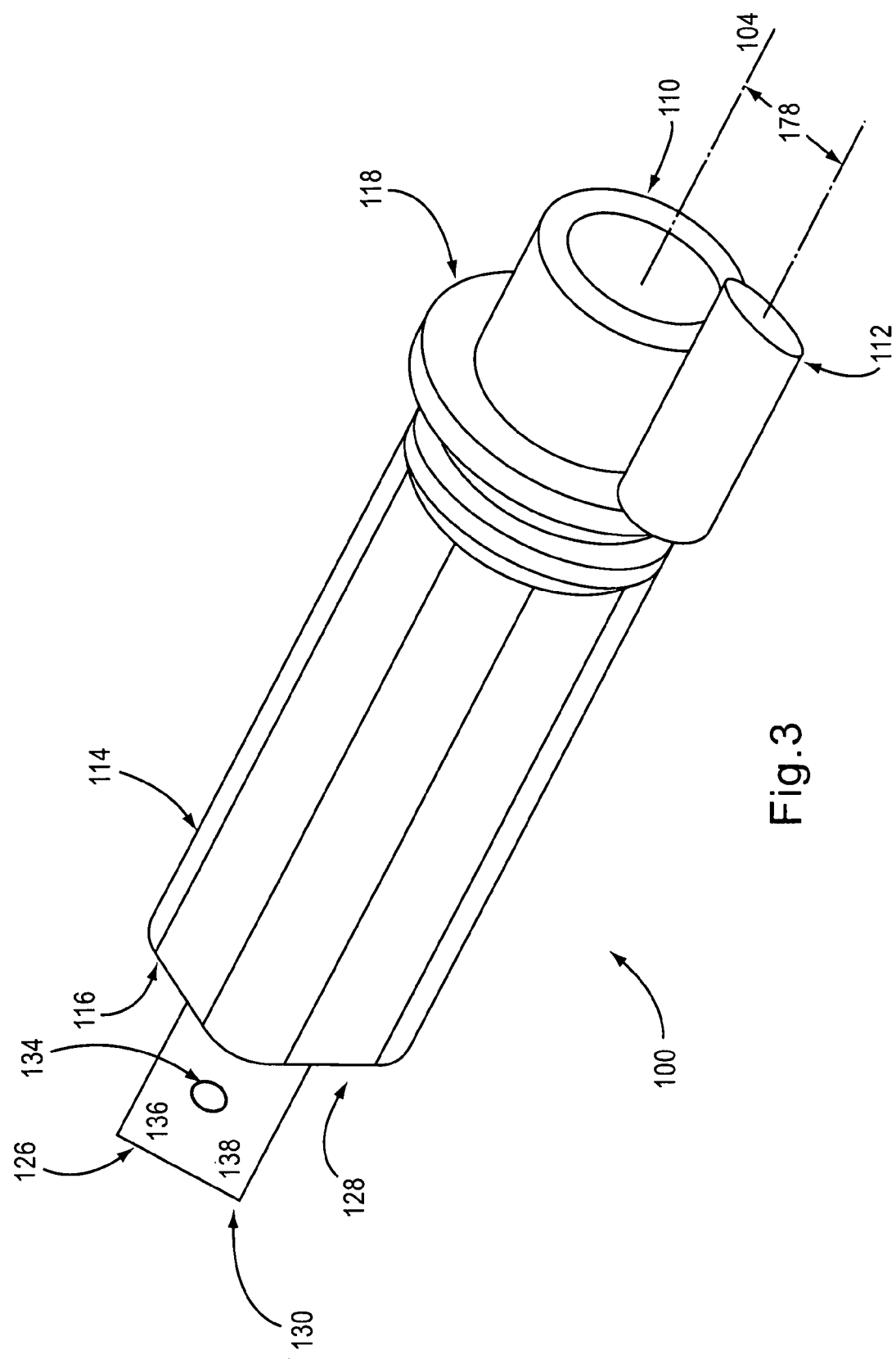
FIG. 3 is a three-quarter view of a flexible connector according to the embodiment shown in FIG. 1.

In FIG. 1 through 3 is shown a flexible connector 100 according to a first embodiment of the invention. In one embodiment, flexible connector 100 may include a tube 114 having an open end 116 and a lower end 118 distal from open end 116, and a drive axis of rotation 104. An inner surface 120 of open end 116 may have a plurality of apices 122 forming a substantially polygonal lower cross-section 124 normal to drive axis of rotation 104. In several embodiments, shown in FIGS. 7A-7G, lower cross-section 124 may be a square, a triangle, a quadrilateral, a pentagon, a hexagon, a rhombus, or a trapezoid. In one embodiment, shown in FIG. 7C, lower cross-section 124 may be substantially square.

In one embodiment, a lower shaft 110 may be disposed fixedly at lower end 118 substantially parallel to drive axis of rotation 104. In this embodiment, lower shaft 110 may have a driven lug 112 disposed fixedly at a surface of lower shaft 110. In one embodiment, driven lug 112 may be offset a predetermined distance 178 from drive axis of rotation 104.

In one embodiment, an upper shaft 126 may have an insert end 128 disposed insertably in open end 116, an upper end 130 distal from insert end 128, and a driven axis of rotation 132. Upper end 130 may have a drive aperture 134 substantially normal to driven axis of rotation 132.

An outer surface 136 of insert end 128 may have a plurality of substantially planer flats 138 forming a substantially polygonal upper cross-section 148 normal to driven axis of rotation 132. In several embodiments, shown in FIGS. 8A-8G, upper cross-section 148 may be a square, a triangle, a quadrilateral, a pentagon, a hexagon, a rhombus, or a trapezoid. In one embodiment, shown in FIG. 8C, upper cross-section 148 may be substantially similar to lower cross-section 124.

In one embodiment, an elastic member 156 may be disposed compressably between each of flats 138 and each of apices 122. In another embodiment, an elastic member 156 may be disposed compressably between at least one of flats 138 and apices 122. In this embodiment, elastic members 156 may be dispersed rotationally symmetrically about driven axis of rotation 132, such as, for example, between every other flat 138/apex 122 pair, or between every third flat 138/apex 122 pair. In several embodiments, elastic member 156 may be a resilient cord, a polymeric cylinder, an elastomeric cylinder, or a length of braided metal or fibrous cable.

Figure 6:
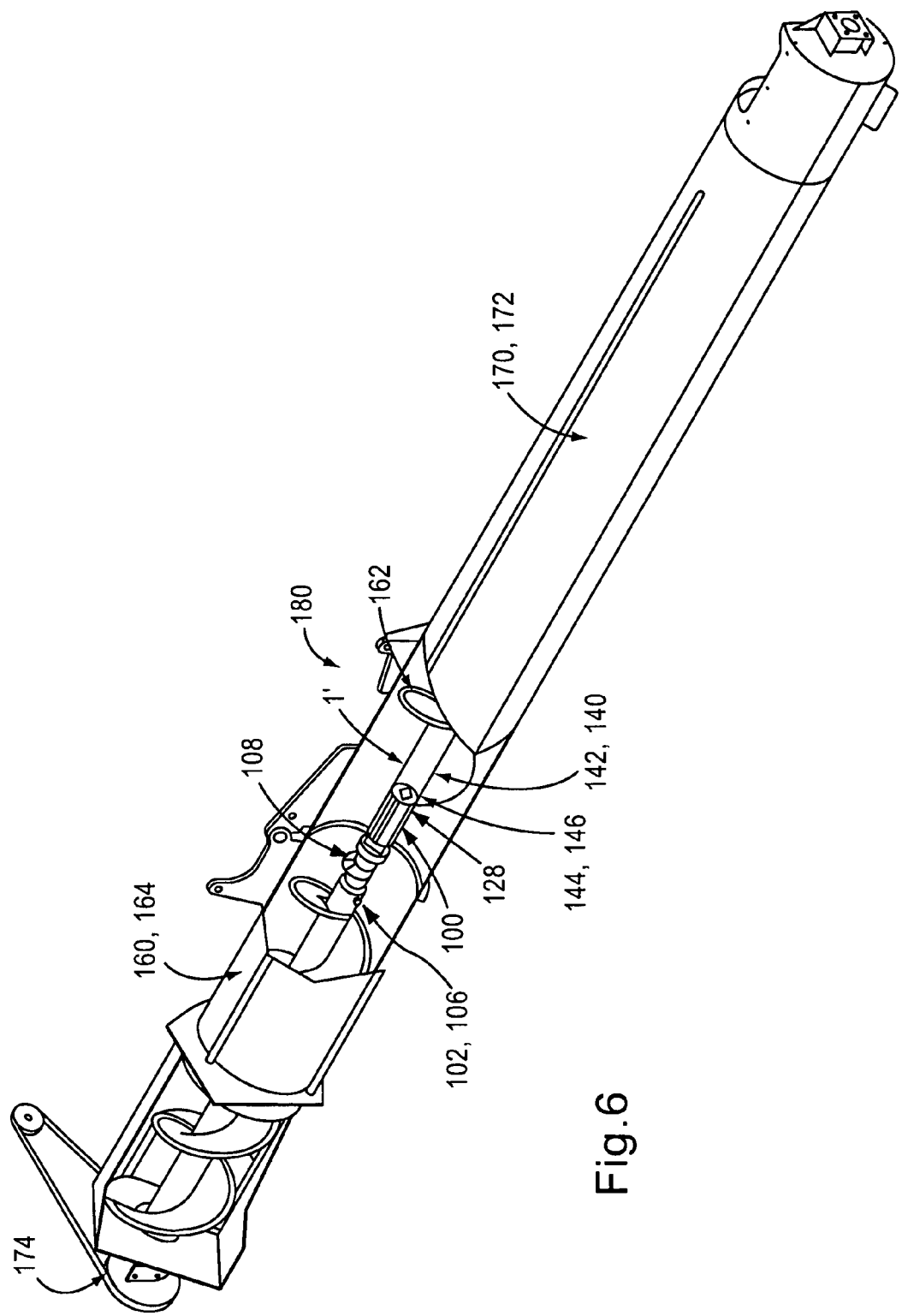
FIG. 6 is an exploded view of an augur for use with a flexible connector according to the embodiment shown in FIG. 1.

In one embodiment, shown in FIGS. 4 through 6, flexible connector 100 may connect a drive end 106 of a drive shaft 102 to a driven end 142 of a driven shaft 140 to form an auger 180. In one embodiment, a drive blade 158 may be disposed substantially helically about drive shaft 102. In this embodiment, a drive housing 160 may be disposed substantially concentrically about drive blade 158. In this embodiment, drive housing 160 and drive blade 158 may comprise a drive auger 164.

In one embodiment, a hanger 166 may be disposed in drive housing 160, and a bearing 168 may be disposed insertably at an end of hanger 166. In this embodiment, drive end 106 is may be disposed rotatably in bearing 168. In one embodiment, lower shaft 110 may be disposed insertably within drive end 106.

In one embodiment, a driven blade 162 may be disposed substantially helically about driven shaft 140. In this embodiment, a driven housing 170 may be disposed substantially concentrically about driven blade 162. In this embodiment, driven housing 170 and driven blade 162 may comprise a driven auger 172. In one embodiment, drive blade 158 may line up substantially with driven blade 162 at flexible coupling 100.

In one embodiment, an insert aperture 144 having a substantially polygonal insert cross-section 146 may be disposed fixably in driven end 142. Insert cross-section 146 may be substantially congruent to upper cross-section 148. Insert end 128 may be disposed insertably within insert aperture 144. In one embodiment, insert end 128 may be pressed into insert aperture 144. In an alternative embodiment, insert end 128 may be slipped into insert aperture 144.

In one embodiment, driven shaft 140 may have a driven aperture 150 proximate to drive aperture 134, and a bolt 152 may be disposed insertably within drive aperture 134 and driven aperture 150.

In one embodiment, a drive lug 108 may be disposed fixedly at a surface of drive end 106. In this embodiment, drive lug 108 may be offset substantially predetermined distance 178 from drive axis of rotation 104. In one embodiment, driven lug 112 may substantially abut drive lug 108.

In this embodiment, a torque 154 applied to drive shaft 102 may force drive lug 108 against driven lug 112, transmitting torque 154 to lower shaft 110 and tube 114. In this embodiment, torque 154 applied to tube 114 compresses elastic members 156 against flats 138, transmitting torque 154 to insert end 128 and upper end 130. In this embodiment, insert end 128 may transmit torque 154 to insert aperture 144 and driven shaft 140. In an alternative embodiment, a torque 176 applied in the opposite direction may force drive lug 108 away from driven lug 112. In this embodiment, torque 176 may not be transmitted to lower shaft 110 and tube 114. Thus, drive lug 108 and driven lug 112 may comprise a one-way drive coupling.

In one embodiment, flexible connector 100 may include an actuator 174 operably connected to drive shaft 102, actuator 174 applying torque 154 to drive shaft 102. In several embodiments, actuator 174 may be a hydraulic actuator, such as an hydraulic motor or a hydrostatic drive driven by an hydraulic pump slaved to a tractor power take off (PTO) shaft, or plumbed into an hydraulic circuit of the tractor itself, a chain or belt driven actuator slaved to a PTO, an electric motor, or a pneumatic motor.

In a second embodiment, a method of flexible connection may include the steps of applying torque 154 to drive shaft 102, forcing drive lug 108 against driven lug 112 with drive shaft 102, transmitting torque 154 to lower shaft 110 and tube 114 with driven lug 112, compressing elastic members 156 against flats 138 with tube 114, transmitting torque 154 to an insert end 128 and an upper end 130 with elastic members 156, and transmitting torque 154 to an insert aperture 144 and driven shaft 140 with insert end 128.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts.

While various embodiments of the present invention have been described above, they should be understood to have been presented by way of examples only, and not limitation. Thus, the breadth and scope of the present invention should not be limited by the above described embodiments.

Obviously, numerous modifications and variations of the present invention are possible in light of the above teachings. It is therefore to be understood that the invention may be practiced otherwise than as specifically described herein.

What is claimed is:

1. A flexible connector comprising:
   a drive shaft having a drive axis of rotation and a drive end, a drive lug disposed fixedly at a surface of said drive end, said drive lug being offset substantially from said drive axis of rotation;
   a lower shaft disposed insertably within said drive end, said lower shaft having a driven lug disposed fixedly at a surface of said lower shaft substantially abutably to said drive lug;
   a tube having an open end and a lower end distal from said open end, said lower end disposed fixedly at said lower shaft substantially parallel to said drive axis of rotation, an inner surface of said open end comprising a plurality of apices forming a substantially polygonal lower cross-section normal to said drive axis of rotation;
   an upper shaft having an insert end disposed insertably in said open end, an upper end distal from said insert end, and a driven axis of rotation, said upper end having a drive aperture substantially normal to said driven axis of rotation, an outer surface of said insert end comprising a plurality of substantially planer flats forming a substantially polygonal upper cross-section normal to said driven axis of rotation, said upper cross-section being substantially similar to said lower cross-section;
   an elastic member disposed compressably between each of said flats and each of said apices;
   a driven shaft having a driven end, an insert aperture having a substantially polygonal insert cross-section disposed fixably in said driven end, said insert cross-section being substantially congruent to said upper cross-section, said insert end disposed insertably within said insert aperture, said driven shaft having a driven aperture proximate to said drive aperture; and
   a bolt disposed insertably within said drive aperture and said driven aperture;
   wherein a torque applied to said drive shaft forces said drive lug against said driven lug, transmitting said torque to said lower shaft and said tube;
   wherein said torque applied to said tube compresses said elastic members against said flats, transmitting said torque to said insert end and said upper end; and
   wherein said insert end transmits said torque to said insert aperture and said driven shaft.

2. The flexible connector of claim 1, further comprising a drive blade disposed substantially helically about said drive shaft.

3. The flexible connector of claim 2, further comprising a drive housing disposed substantially concentrically about said drive blade, said drive housing and said drive blade comprising a drive auger.

4. The flexible connector of claim 3, comprising further:
   a hanger disposed in said drive housing; and
   a bearing disposed insertably at an end of said hanger;
   wherein said drive end is disposed rotatably in said bearing.

5. The flexible connector of claim 1, further comprising a driven blade disposed substantially helically about said driven shaft.

6. The flexible connector of claim 5, further comprising a driven housing disposed substantially concentrically about said driven blade, said driven housing and said driven blade comprising a driven auger.

7. The flexible connector of claim 1, wherein said lower cross-section is selected from the group consisting of:
   a square,
   a triangle,
   a quadrilateral,
   a pentagon,
   a hexagon,
   a rhombus, and
   a trapezoid.

8. The flexible connector of claim 1, wherein said upper cross-section is selected from the group consisting of:
   a square,
   a triangle,
   a quadrilateral,
   a pentagon,
   a hexagon,
   a rhombus, and
   a trapezoid.

9. The flexible connector of claim 1, comprising further an actuator operably connected to said drive shaft, said actuator applying said torque to said drive shaft.

* * * * *